(12) United States Patent
Henman et al.

(10) Patent No.: US 9,829,596 B2
(45) Date of Patent: *Nov. 28, 2017

(54) AUTONOMOUS SEISMIC NODE HANDLING AND STORAGE SYSTEM

(71) Applicant: Seabed Geosolutions B.V., Leidschendam (NL)

(72) Inventors: Richard Edward Henman, Horsham (GB); Arne Henning Rokkan, Leidschendam (NL); Johan Fredrik Naes, Trondheim (NO); Mariann Ervik, Trondheim (NO); Leif Johan Larsen, Alversund (NO); Arve Jaatun, Randaberg (NO); Ole-Fredrik Semb, Tolvsrod (NO)

(73) Assignee: Seabed Geosolutions B.V., Leidschendam (NL)

(*) Notice: Subject to any disclaimer, the term of this patent is extended or adjusted under 35 U.S.C. 154(b) by 0 days.

This patent is subject to a terminal disclaimer.

(21) Appl. No.: 15/258,522

(22) Filed: Sep. 7, 2016

(65) Prior Publication Data
US 2016/0377757 A1    Dec. 29, 2016

Related U.S. Application Data

(63) Continuation of application No. 14/711,262, filed on May 13, 2015, now Pat. No. 9,459,366.
(Continued)

(51) Int. Cl.
*G01V 1/38* (2006.01)

(52) U.S. Cl.
CPC .......... *G01V 1/3852* (2013.01); *G01V 1/3843* (2013.01)

(58) Field of Classification Search
CPC .... G01V 1/168; G01V 1/3843; G01V 1/3852; B63B 35/04
See application file for complete search history.

(56) References Cited

U.S. PATENT DOCUMENTS

| | | | |
|---|---|---|---|
| 5,458,265 | A | 10/1995 | Hester |
| 5,655,753 | A | 8/1997 | Berges et al. |

(Continued)

FOREIGN PATENT DOCUMENTS

| | | |
|---|---|---|
| EP | 1870733 A2 | 12/2007 |
| EP | 1870733 A3 | 9/2009 |

(Continued)

*Primary Examiner* — Benjamin Fiorello
*Assistant Examiner* — Aaron Lembo
(74) *Attorney, Agent, or Firm* — Park, Vaughan, Fleming & Dowler LLP; Shane Nelson

(57) ABSTRACT

Embodiments of systems and methods for storing and handling a plurality of autonomous seismic nodes are presented. The node handling and storage system may be coupled to a node deployment system that deploys and/or retrieves nodes from water from the back deck of a marine vessel. One embodiment of the node handling and storage system includes a plurality of portable containers that may be assembled in a variety of configurations based on the vessel and survey requirements. The containers are coupled to an autonomous or semi-autonomous node conveyor and/or transport system that moves the nodes between and within the containers for node cleaning, downloading, charging, servicing, and storage. The conveyor system may include a plurality of different transport devices and/or systems, such as rotatable conveyors, lateral conveyors, lift mechanisms, and elevators.

21 Claims, 11 Drawing Sheets

Related U.S. Application Data

(60) Provisional application No. 61/993,744, filed on May 15, 2014.

(56) References Cited

U.S. PATENT DOCUMENTS

| | | |
|---|---|---|
| 5,902,072 A | 5/1999 | Berges |
| 6,024,344 A | 2/2000 | Buckley |
| 6,044,786 A | 4/2000 | Dudley |
| 6,657,921 B1 | 12/2003 | Ambs |
| 7,254,093 B2 | 8/2007 | Ray |
| 7,260,024 B2 | 8/2007 | Goujon |
| 7,286,442 B2 | 10/2007 | Ray et al. |
| 7,310,287 B2 | 12/2007 | Ray |
| 7,561,493 B2 | 7/2009 | Ray |
| 7,602,667 B2 | 10/2009 | Thompson |
| 7,646,670 B2 | 1/2010 | Maxwell |
| 7,649,803 B2 | 1/2010 | Thompson |
| 7,668,047 B2 | 2/2010 | Ray |
| 7,724,607 B2 | 5/2010 | Ray |
| 7,778,114 B2 | 8/2010 | Goujon |
| 7,804,737 B2 | 9/2010 | Thompson |
| 7,883,292 B2 | 2/2011 | Thompson |
| 7,929,378 B2 | 4/2011 | Gros |
| 7,933,165 B2 | 4/2011 | Thompson |
| 7,986,589 B2 | 7/2011 | Ray |
| 7,990,803 B2 | 8/2011 | Ray |
| 8,021,080 B2 | 9/2011 | Frivik |
| 8,050,140 B2 | 11/2011 | Ray |
| 8,087,848 B2 | 1/2012 | Thompson |
| 8,149,647 B2 | 4/2012 | Borgen |
| 8,172,480 B2 | 5/2012 | Thompson |
| 8,226,328 B2 | 7/2012 | Thompson |
| 8,228,761 B2 | 7/2012 | Ray |
| 8,328,467 B2 | 12/2012 | Thompson |
| 8,407,008 B2 | 3/2013 | Pavel et al. |
| 8,427,900 B2 | 4/2013 | Fleure |
| 8,619,495 B2 | 12/2013 | Thompson |
| 8,675,446 B2 | 3/2014 | Gateman |
| 8,801,328 B2 | 8/2014 | Thompson |
| 2003/0218937 A1 | 11/2003 | Berg et al. |
| 2005/0052951 A1 | 3/2005 | Ray et al. |
| 2006/0243189 A1 | 11/2006 | Thompson et al. |
| 2008/0267009 A1 | 10/2008 | Frivik |
| 2009/0052992 A1 | 2/2009 | Thompson et al. |
| 2010/0054078 A1 | 3/2010 | Thompson et al. |
| 2010/0074048 A1 | 3/2010 | Furuhaug |
| 2011/0051550 A1 | 3/2011 | Lindberg |
| 2012/0294122 A1 | 11/2012 | Ray |
| 2013/0308421 A1 | 11/2013 | Thompson |
| 2014/0198607 A1 | 7/2014 | Etienne |
| 2015/0331126 A1 | 11/2015 | Lambert et al. |
| 2016/0009491 A1 | 1/2016 | Jewell et al. |

FOREIGN PATENT DOCUMENTS

| | | |
|---|---|---|
| WO | 2005074426 A2 | 8/2005 |
| WO | 2006/041438 A1 | 4/2006 |
| WO | 2011/139159 A1 | 11/2011 |
| WO | 2014/027892 A1 | 2/2014 |
| WO | 2014/084741 A1 | 6/2014 |
| WO | 2014/185787 A1 | 11/2014 |

AUTONOMOUS SEISMIC NODE HANDLING AND STORAGE SYSTEM

PRIORITY

The present application is a continuation application of U.S. patent application Ser. No. 14/711,262, filed on May 13, 2015, which claims priority to U.S. provisional patent application No. 61/993,744, filed on May 15, 2014. The entire contents of each of the above documents is hereby incorporated herein by reference.

FIELD

This application is directed to marine seismic systems, and more particularly to the storage and handling of autonomous seismic nodes on a marine vessel.

BACKGROUND

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 m or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded or integrally linked (via communications and/or power) via wire or wireless links (such as acoustic, electromagnetic, or optical links). One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment A marine vessel should be configured to efficiently deploy and recover nodes before and after their use in the water. The existing techniques for attaching an autonomous node to a cable suffer from many disadvantages. Further, the techniques in which such nodes are deployed and retrieved from a marine vessel, as well as the manner in which such nodes are stored and handled on the vessel, suffer from many disadvantages. A novel node handling system is needed that is autonomous, limits the need for operator involvement and handling of the nodes, and is very fast and efficient. A novel node handling system is needed that is easily portable and/or moveable and is highly customizable based on the needs of the survey and/or vessel. A novel node handling system is needed that provides a high capacity of nodes (e.g., a vessel that may store and utilize thousands of nodes for a survey) based on a limited footprint and use of the vessel's space. One of ordinary skill will recognize several additional problems with permanently installed conventional deck handling and storage systems for autonomous seismic nodes that can be solved with a novel node handling system.

SUMMARY

Embodiments of systems and methods for storing and handling a plurality of autonomous seismic nodes are presented. The node handling and storage system may be coupled to a node deployment system that deploys and/or retrieves nodes from the water from the back deck of a marine vessel. One embodiment of the node handling and storage system includes a plurality of portable containers that may be assembled in a variety of configurations based on the vessel and survey requirements. In one embodiment, each of the containers is arranged such that a side wall of a container is adjacent to the side wall of another container. A conveyor system may be coupled to each of the plurality of containers and is configured to transport nodes between and within each of the containers. In one embodiment, the conveyor system may comprise a plurality of different transport devices and/or systems, such as rotatable conveyors, lateral conveyors, lift mechanisms, and elevators. Each container may comprise a plurality of different conveyor systems. The node handling and storage system may include a plurality of storage containers, each of which may be arranged to hold more than 500 nodes.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1A:
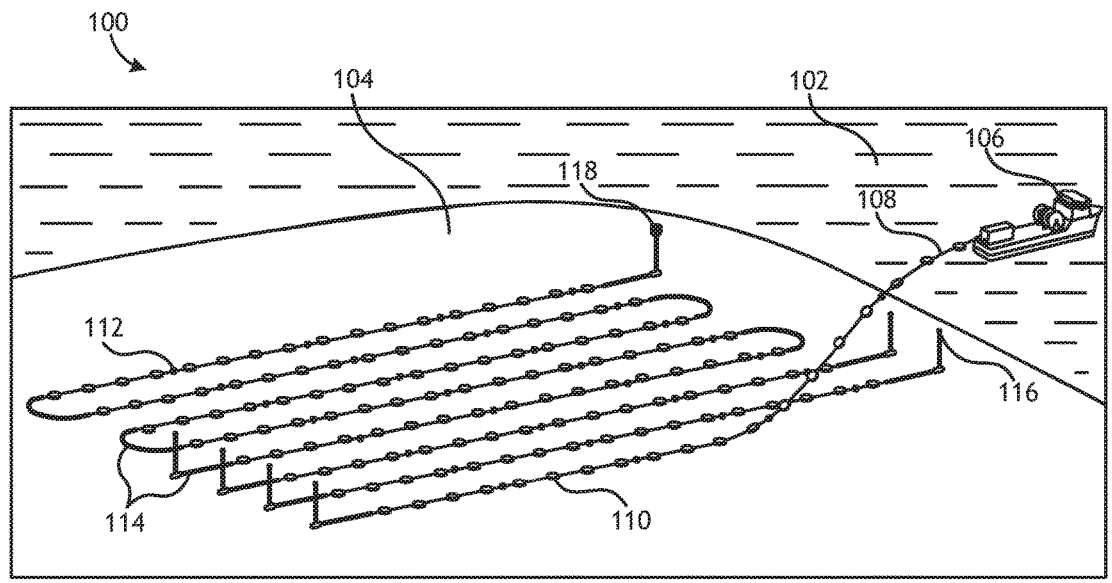
FIG. 1A is a schematic diagram illustrating one embodiment of a system for marine deployment of an autonomous seismic node.

Various features and advantageous details are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

The present embodiments include systems, methods, and apparatuses for handling and storing a plurality of autonomous seismic ocean bottom nodes. In an embodiment, the node handling and storage system is modular and/or container-based, such that the addition and/or removal of function specific containers (e.g., service, storage, downloading/charging, cleaning, etc.) based on the particular survey and/or vessel requirements is straightforward. The containers are standardized and highly portable, and can be transported via a variety of mechanisms (train, boat, truck, etc.) to a wide variety of vessels and configured on board the deck of a marine vessel. The containers may be transported onboard regular container vessels as opposed to more expensive vessel transports. The disclosed embodiment provides an autonomous, high-speed node handling system that is configured to store thousands of nodes for use in a seismic survey. The disclosed node storage and handling system provides a high capacity node storage system in a compact and efficient manner that is useable on a variety of vessels. This volume of node storage and handling in a small footprint on a vessel is significantly greater than the volume of nodes used, stored, and handled in conventional autonomous node deployment and retrieval operations. Further, the system may be configured as a fully automated handling system that improves safety and efficiency by providing minimal human physical interaction with the node as otherwise required by conventional autonomous node retrieval and handling operations.

Node Deployment

Figure 1B:
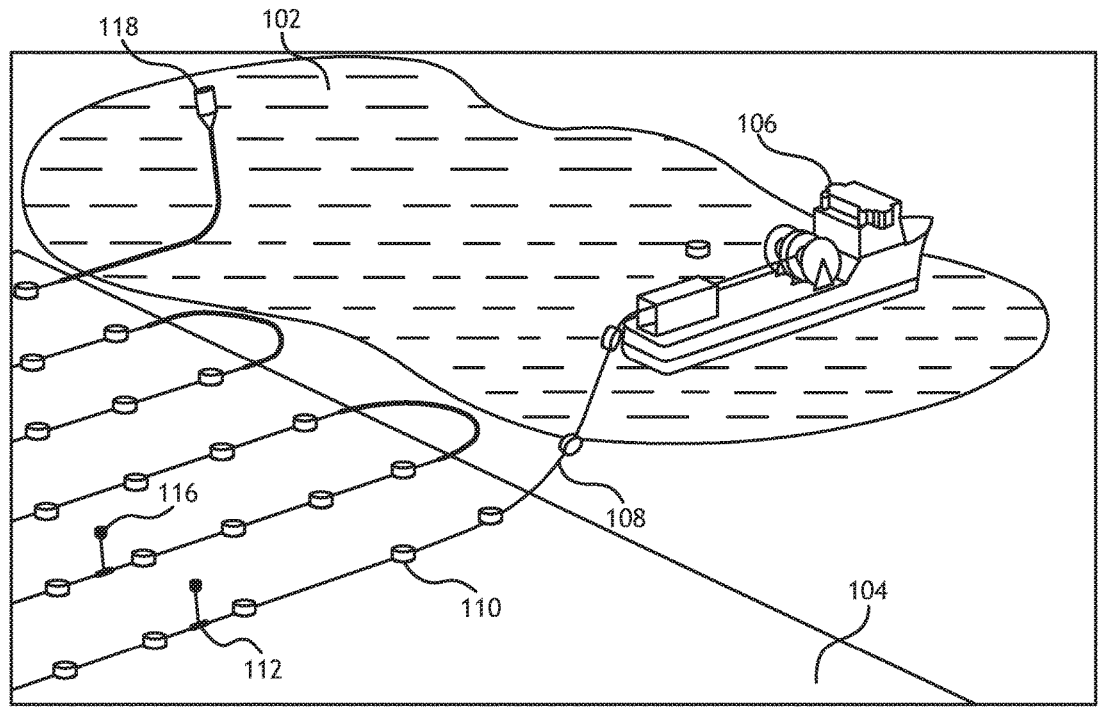
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108 (i.e., deployment cables). One or more seismic nodes 110 may be attached directly to the deployment line 108. Additionally, the marine deployment system 100 may include one or more acoustic positioning transponders 112, one or more weights 114, one or more pop up buoys 116, and one or more surface reference buoys 118. As is standard in the art, weights 114 can be used at various positions of the cable to facilitate the lowering and positioning of the cable, and fixed marker buoys 118 or subsurface releasable buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit an acoustic signal to the marine vessel for indicating the positioning of the seismic nodes 110 on the sea floor 104. In an embodiment, the weights 114 may be coupled to the deployment line 108 and be arranged to keep the seismic nodes 110 in a specific position relative to the sea floor 104 at various points, such as during start, stop, and snaking of the deployment line 108.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel or winch. The seismic nodes 110 may be stored in one or more storage containers. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular interval (such as 25 meters) while the deployment line 108 is lowered through the water column and draped linearly or at varied spacing onto the seabed. During recovery each seismic node 110 may be clipped off the deployment line 108 as it reaches deck level of the vessel 106. Preferably, nodes 110 are clipped directly onto the deployment line 108 in an automated process using node attachment or coupling machines on board the deck of the marine vessel 106 at one or more workstations or containers. Likewise, a coupling machine is configured to decouple or otherwise disengage the seismic nodes 110 from the deployment line 108, and in some instances may use a detachment tool for such detaching. Alternatively, the seismic nodes 110 can be attached via manual or semi-automatic methods. The seismic nodes 110 can be attached to the deployment line 108 in a variety of configurations, which allows for proper rotation of the seismic node 110 about the deployment line 108 and allows for minimal axial movement on the deployment line 108. For example, the deployment line 108 can be attached to the top, side, or center of a seismic node 110 via a variety of configurations.

Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data acquisition by the seismic nodes 110. Embodiments of the system 100 may be deployed in both coastal and offshore waters in various depths of water. For example, the system may be deployed in a few meters of water or in up to several thousand meters of water. In some embodiments, the depth may be between twenty (20) meters and five hundred (500) meters or more. In some configurations the marker buoy 118 or the pop up buoy 116 may be retrieved by the marine vessel 106 when the seismic nodes 110 are to be retrieved from the sea floor 104. Thus, the system 110 may not require retrieval by means of a submersible or diver. Rather, the pop up buoy 116 or marker buoy 118 may be picked up on the surface 102 and the deployment line 108 may be retrieved along with the seismic nodes 110.

As mentioned above, ocean bottom nodes (OBNs) can be placed on the seabed in a variety of different mechanisms. In one embodiment, one or more marine vessels deploy and recover a cable (or rope) with attached OBNs according to a particular survey pattern. As discussed above, one or more nodes may be attached directly to the deployment line using a locking mechanism on the node or can be coupled to the line via a rope or other coupling line. In other embodiments, rather than using sensors or nodes directly attached to a deployment line, the nodes can be placed by a tethered remotely operated vehicle (ROV) on the seafloor, as is known in the art, such as that described in U.S. Pat. No. 6,975,560, incorporated herein by reference. With this method, a marine vessel will typically have one or more ROVs and a plurality of OBNs, and may separately or in conjunction lower the ROVs and OBNs close to the seabed. The ROV then individually places each node on the seabed in the desired location. When the nodes are to be removed from the seabed, the nodes can be recovered by an ROV and received by the surface vessel with a variety of mechanisms. In still other embodiments, an OBN may be part of and/or coupled to an autonomous underwater vehicle (AUV), such that the AUV (and node/sensor) is steered from a marine vessel or other subsea location to the intended seabed destination for the survey and data recording, as described in U.S. Publication No. 2013/0083624, incorporated herein by reference. Once the survey is complete, the AUVs can either be recovered and/or steered back to the marine vessel for data downloading of the nodes and seismic data. While the disclosed node deployment system attaches the nodes to a cable, the storage and handling system described herein is not necessarily limited to any particular deployment and/or retrieval method or system of the autonomous seismic nodes.

Autonomous Seismic Node Design

Figure 2A:
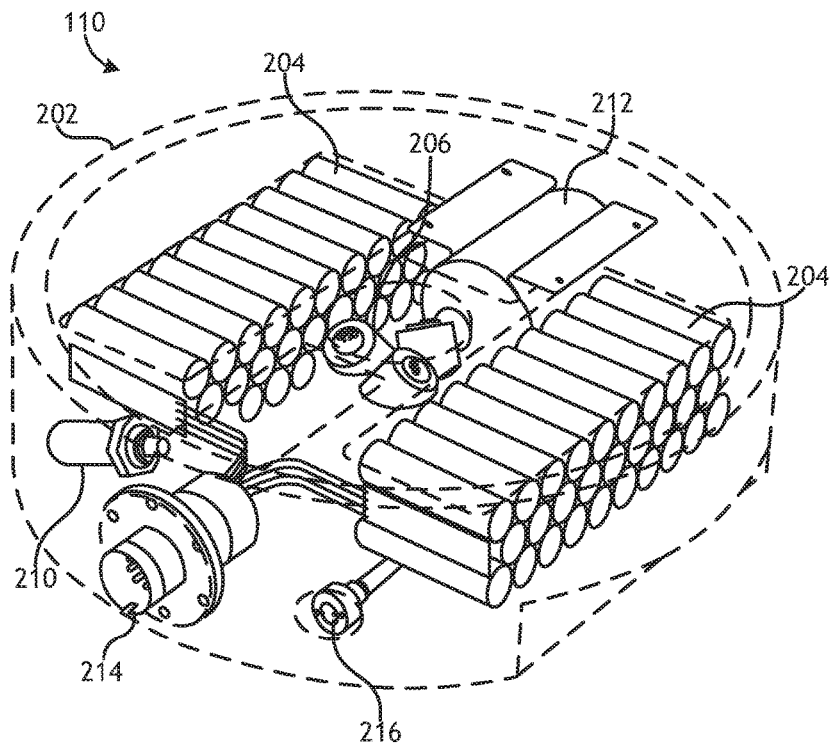
FIG. 2A illustrates a perspective view diagram of one embodiment of an autonomous seismic node.

FIG. 2A illustrates a perspective view diagram of an autonomous seismic node 110. The seismic node 110 may include a body 202, such as a housing, frame, skeleton, or shell, which may be easily dissembled into various components. Additionally, the seismic node 110 may include one or more battery cells 204. In an embodiment, the battery cells 204 may be lithium-ion battery cells or rechargeable battery packs for an extended day endurance (such as 90 days) on the seabed, but one of ordinary skill will recognize that a variety of alternative battery cell types or configurations may also be used. Additionally, the seismic node may include a pressure release valve 216 configured to release unwanted pressure from the seismic node 110 at a pre-set level. The valve protects against fault conditions like water intrusion and outgassing from a battery package. Additionally, the seismic node may include an electrical connector 214 configured to allow external access to information stored by internal electrical components, data communication, and power transfer. During the deployment the connector is covered by a pressure proof watertight cap 218 (shown in FIG. 2B). In other embodiments, the node does not have an external connector and data is transferred to and from the node wirelessly, such as via electromagnetic or optical links.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, and magnetometers. Except for the hydrophone, these components are preferably contained within the node housing that is resistant to temperatures and pressures at the bottom of the ocean, as is well known in the art.

Figure 2B:
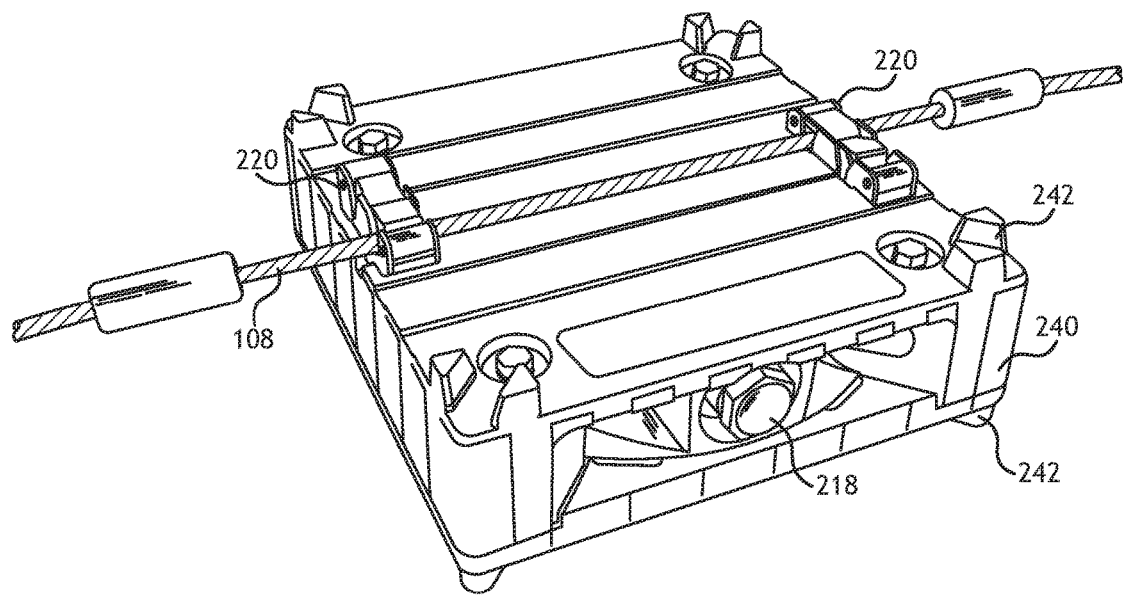
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or housing that contains all of the node's internal components. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. In one embodiment, the node is approximately 350 mm×350 mm wide/deep with a height of approximately 150 mm.

In another embodiment, as shown in FIG. 2B, the node's pressurized housing may be coupled to an external node housing 240 that may include integrated fenders and/or bumpers. Various portions of the node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the fender housing include a plurality of gripping teeth or protrusions 242 for engaging the seabed and for general storage and handling needs. In other embodiments, a bumper is attached to each of the corners of the node housing via bolts or pins. In another embodiment, portions of the housing, such as the corners, include grooved pockets or recesses or receptacles that engage a corresponding mating unit on the node housing for integrated stacking/ storing of the nodes. External node housing 240 provides many functions, such as protecting the node from shocks and rough treatment, coupling the node to the seabed for better readings and stability, and assisting in the stackability, storing, alignment, and handling of the nodes. Each node housing may be made of a durable material such as rubber, plastic, carbon fiber, or metal.

Node Storage and Handling System

Figure 3:
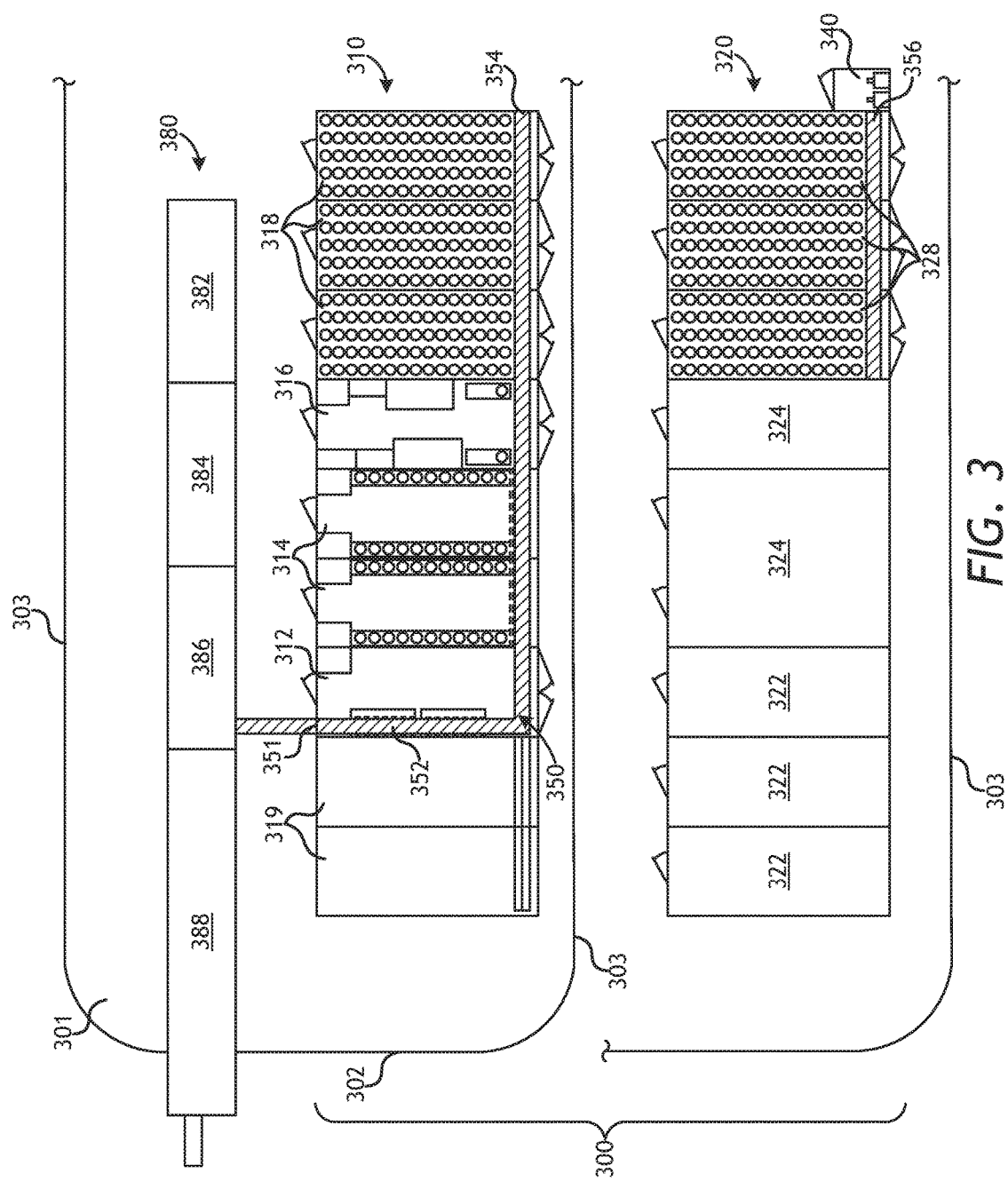
FIG. 3 illustrates a deck layout of one embodiment of an autonomous node handling and storage system.

FIG. 3 illustrates a schematic of one embodiment of a deck handling system. While the deck handling system may be located on any portion of the vessel, in one embodiment it is located on the back deck of a marine vessel. Of relevance to FIG. 3, the vessel 301 comprises a back, end, or aft section 302 and two sides 303. For convenience purposes, the rest of the marine vessel is not shown in FIG. 3. As shown, in one embodiment a node storage and handling system 300 is coupled to one or more deployment systems 380. An autonomous seismic node deployment system may include one or more winches 382, one or more node installation devices 384, one or more tension control systems 386, one or more overboard units 388, and other devices and/or systems to facilitate deployment and/or retrieval of a plurality of autonomous seismic nodes from the water before and after the nodes are used in a seismic survey. In one embodiment, the node deployment system 380 is configured to attach and detach a plurality of nodes 110 to a deployment cable or rope 108 and for the deployment and retrieval of the cable into the water. In an alternative embodiment, the marine vessel includes two such node deployment systems, with the second system being either a backup or used simultaneously as the first system. Node storage and handling system 300 is configured to handle the nodes before and after the deployment and retrieval operations performed by node deployment system 380.

The node handling system 300 is configured such that each operational task is located within a module/container. In one embodiment, each container has separate control systems for local and/or remote operation of the tasks performed in the container. With this modular/container-based system, the addition and/or removal of service and storage containers based on the particular survey and/or vessel requirements is straightforward. In one embodiment, the node handling system 300 consists of a set of containerized systems for node storage, charging/downloading, cleaning, data handling, and maintenance systems, which are interconnected by conveyor or transport systems to the deployment area where the individual nodes are fixed to the cable before being deployed from the rear of the vessel.

One embodiment of the node handling system 300 uses standard sized ISO shipping containers in a plurality of configurations for efficient handling and storage of the nodes. Standard sized containers are typically 20 or 40 feet long and 8 feet wide. The heights of such containers may vary from 8 feet for standard height containers to 10 feet, 6 inches for high-cube or purpose made containers. In other embodiments, containers may be custom designed and ISO certified. Each container preferably has a floor, roof, and sidewalls, with various portions removed to facilitate transfer of nodes from each container as needed, or to allow service personnel access to the container. The content of each container is modified for the particular task of the container, such as cleaning, storage, data transfer, charging, deployment, etc. The containers can be transported via air, road, train, or sea to a destination harbor and mobilized on a suitable vessel. The containers may be transferred to the deck of a vessel via a crane or other lifting device and then secured to the deck and coupled to each other through various fastening mechanisms. The containers may be positioned side to side, end to end, and even on top of each other (up to 3 or 4 levels high) on the deck depending on the specific layout of the containers, need of the survey, and requirements of the vessel. The system setup may vary from job to job and from vessel to vessel, in both layout and number of modules/containers utilized. In one embodiment, a conveyor system may be used to transfer nodes from at least one container to another container and within the containers, and an elevator system may be used to transfer nodes and other equipment from containers on the lower deck to containers on upper decks (and vice versa). As an additional embodiment, any given container may have multiple conveyor systems or robots to facilitate the particular tasks performed in the container. Various configurations of the deck handling system on the marine vessel are consistent with the disclosed embodiments herein. For example, for some vessels or surveys, only the lower deck may be used, while for other vessels or surveys both the lower and one or more upper decks (which includes extra containers) might be used.

FIG. 3 illustrates a deck layout of one embodiment of a node handling and storage system 300. In one embodiment, the node handling and storage system comprises a first plurality of containers 310 (located on a lower deck) and a second plurality of containers 320 (located on an upper deck). In one embodiment, the node handling system comprises at least one container 312 for cleaning, washing and drying of the nodes, a plurality of containers 314 for battery recharge and/or data downloading, at least one service container 316 that is configured as a service and maintenance workshop, a plurality of containers 318 for storage of nodes, and a plurality of containers 319 for the storage of auxiliary equipment, such as transponders and weights. In one embodiment, each container of the node handling system 300 is placed side by side on the back deck of the vessel. In contrast, one or more of the containers of node deployment system 380 may be placed end to end. In this configuration, the containers of the node handling system are substantially perpendicular to the length of the vessel and the containers of the node deployment system are substantially parallel to the length of the vessel. As shown in FIG. 3, some or all of the containers may have doors on the front and/or back portions of the containers for access and/or entry by personnel. A plurality of nodes 110 are shown at various portions of the node handling system and within the various containers.

The node handling system 300 also comprises a conveyor and/or transport system 350. Conveyor system 350 is configured to transfer the nodes between the containers and to and from the deployment system. Conveyor system 350 has a first portion 352 that is at least partially within cleaning container 312 and is substantially parallel to the long side of the container and substantially perpendicular to the deployment line 108 and deployment system 380. Conveyor system 350 has a point of entry/exit 351 between the node deployment system and the node handling system. The conveyor system transfers the plurality of nodes from the node handling system via point 351 to the node deployment system, which attaches and/or detaches the nodes from a deployment cable in an automated, semi-automated, or manual fashion. Conveyor system 350 also comprises a second conveyor portion 354 that is configured to transfer the nodes between the plurality of containers of the node handling system, and thus may be considered a cross-container conveyor system. A portion of conveyor system 354 is located within each of the plurality of containers forming a substantially straight path between the adjacent containers. Second conveyor system portion 354 is located substantially perpendicular to first conveyor system portion 352. A hole or opening is located in the long sides of each container and arranged such that nodes and the conveyor system may pass between each of the containers. During transport, each opening may have a covering or hatch that seals the opening, and when the containers are mobilized onto the ship such a covering/hatch must be removed before putting the containers adjacent to each other. An automatic fire gate may also be part of each opening, which is configured to close in the event of a fire in a container and allows one container to be sealed off from the other containers in case of a fire. Conveyor system 350 may also include one or more transport systems in one or more of the plurality of containers to transport the nodes within an individual container. Conveyor system 350 may also include numerous types of conveyor sub-systems, such as conveyor systems that rotate an individual node in a plurality of directions, conveyor systems that move the node to a different height and/or elevation, and conveyor systems that merely transport the node horizontally.

As mentioned above, for some vessels or surveys, multiple decks or levels of containers may be used for the node handling system. FIG. 3 illustrates one layout of an upper or top deck 320 of a node handling system according to one embodiment. This structure largely follows the configuration of the lower deck handling system 310, and in one embodiment, each of the lower and upper deck handling systems comprise nine containers (for a total of 18 containers). In general, the upper deck node handling system 320 includes a second plurality of containers that sit directly on top of a first plurality of containers 310 on the lower deck. The second plurality of containers may include additional node storage containers 328 for additional node capacity, general equipment storage containers 322, and a plurality of containers 324 for communication, operating, instrument, and navigation data processing systems. Alternatively, one or more of these containers can be made into an instrument room or office area, with the appropriate stairs (inside or outside of the containers) connecting the first and second decks. In one embodiment, second level storage containers 328 are placed directly above and/or on top of first level storage containers 318. An elevator mechanism 340 (described in more detail relating to FIG. 5H) can be used to transfer nodes from the first deck to the second deck, and a conveyor system 356 may be used to transfer nodes between elevator mechanism 340 and storage containers 328. Alternatively, each storage container may include an elevator or vertical conveyor belt or mechanism for transferring the nodes from a lower to upper deck node storage container. In one embodiment, each storage container 328 and the transport systems therein on the second deck is substantially similar to the storage containers 318 and the transport systems therein on the first deck.

Figure 4:
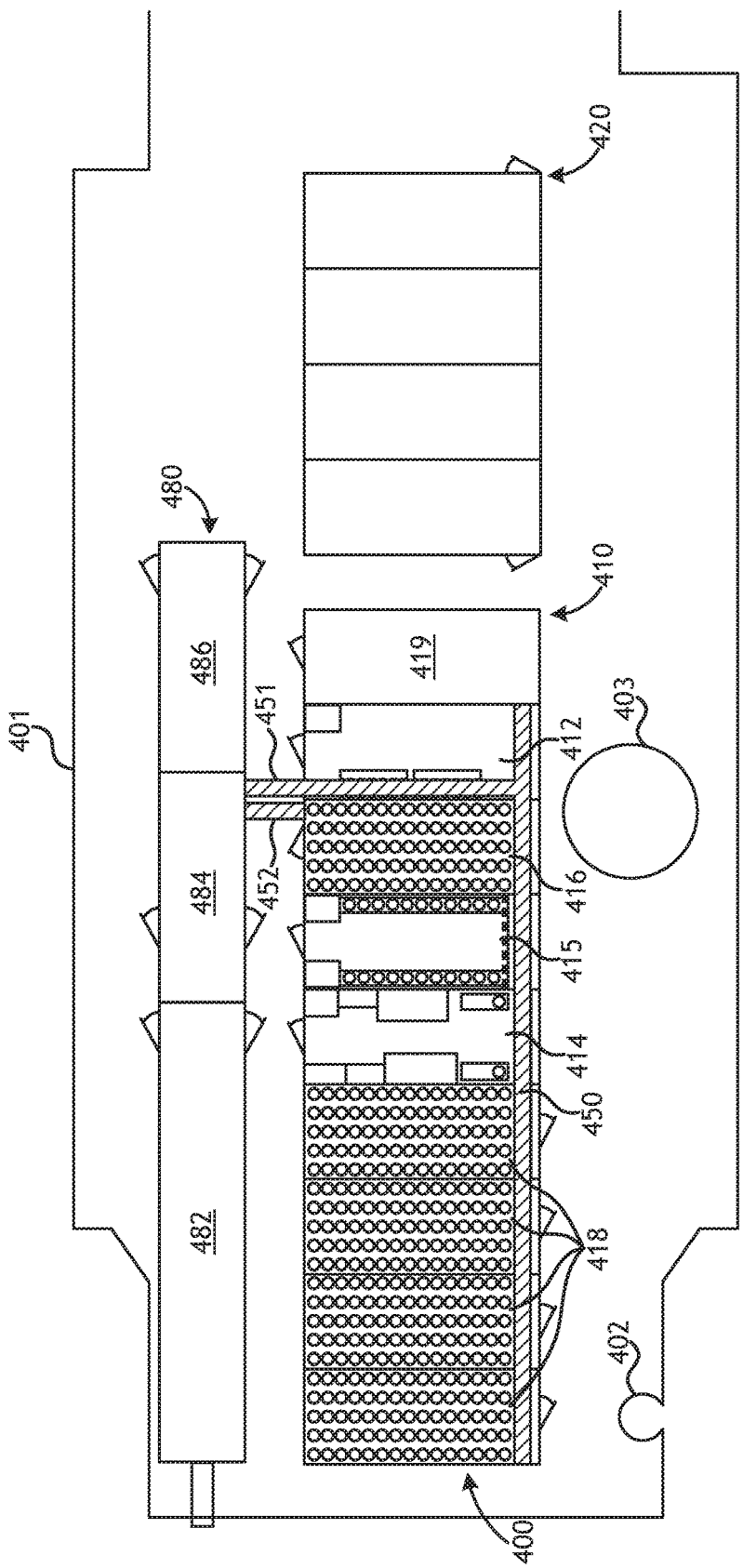
FIG. 4 illustrates a deck layout of another embodiment of an autonomous node handling and storage system.

FIG. 4 illustrates another embodiment of a node handling system layout on the back deck of a marine vessel 401. This other embodiment illustrates the versatility and customization of the container configuration of the node handling system, which may vary based upon survey or vessel requirements. As in FIG. 3, node handling system 400 is coupled to a node deployment system 480, which in this case comprises an overboard unit 482, a roping/deroping unit 484, and a winch unit 486. Also shown on the vessel 401 is an optional crane location 402 on the back deck (which can also be located at other locations on the vessel) to handle light equipment or support overboard deployment/recovery operations and crane base location 403, which is a larger vessel based crane that can be used for installing the container system on the vessel during mobilization. The components of the node handling system 400 are substantially similar to the components of the node handling system 300, but the arrangement and quantity of the components is different. Like the containers in system 300, each of the containers in node storage and handling system 400 is arranged side to side such that a conveyor system 450 is configured to move a plurality of nodes between the containers and to/from the node deployment system. A first group of containers 410 is positioned apart from a second group of containers 420. The first group of containers may be service and/or storage containers and the second group of containers may be for control systems, navigation, processing, navigation, and ersonnel. In contrast to system 300, storage containers 418 are located near the aft portion of vessel 401. In one embodiment, four storage containers 418 are positioned adjacent to each other starting from near the aft portion of the vessel. Additional containers, in order from the back to front of the vessel, include a service container 414, a downloading/charging container 415, an additional fifth storage container 416 with a plurality of charged nodes, a cleaning container 412, and a weight/transponder container 419. In one embodiment, each storage container holds approximately 1000 nodes, such that the node handling system 400 is configured to store approximately 5000 nodes with five storage containers. This volume of node storage and handling in a small footprint on a vessel is significantly greater than the volume of nodes used in conventional autonomous node deployment and retrieval operations. In one embodiment, the node deployment system and node handling system are coupled by a plurality of conveyors. Conveyor 451 may be configured to receive nodes from the node deployment system after they have been retrieved from the sea and direct the nodes to the cleaning container 412 for cleaning. Conveyor 452 may be configured to send nodes from storage container 416 to the node deployment system. Nodes stored in storage container 416 may be fully charged and ready for deployment, and conveyor 452 allows the node handling system to more quickly transport nodes to the node deployment system. Conveyor system 450 may be configured to transport nodes within and between the plurality of containers and may be substantially similar to conveyor system 350.

In operation, the node handling and storage system may operate autonomously or semi-autonomously before and after the nodes have been deployed and/or retrieved from the ocean. The system can operate in a deployment mode (e.g., sending nodes to the node deployment system for deployment into the water) or storage mode (e.g., receiving nodes from the node deployment system for temporary or permanent storage). The processes related to the storage mode are detailed below in relation to FIG. 3, realizing that the processes and/or operations related to the deployment mode are performed in generally a reverse manner as opposed to the storage mode, and the processes may vary based upon the configuration of the node handling system.

Referring to FIG. 3, in one embodiment after the seismic survey has been completed, the cable is retrieved, and one or more of a plurality of nodes 110 are detached from the cable, the nodes are transferred one at a time from the deployment system to cleaning container 312. When washing and/or drying is finished for a particular node, the node moves along a conveyor into charging/downloading container 314. Once data downloading and/or battery recharge is completed for a plurality of nodes, the plurality of nodes are moved from container 314 to service container 316. If individual nodes need servicing (such as those having problems with downloading and/or charging in the downloading/charging container 314), individual nodes can be selected through the automated system to be individually transported to a workstation within service container 316 for maintenance, service, and/or inspection. Nodes that have not been identified as having problems continue through service container 316 to one of the storage containers 318 or via the external elevator system 340 to storage containers 328. In one embodiment, a specific row within a specific rack of a storage container is first filled to capacity with nodes. When a specific row reaches maximum capacity of node storage, the conveyor system transports the next plurality of nodes to a different row. Based on motion controllers, RFID readers, and other positioning systems, the node handling and storage system is configured to detect and/or know when a certain row has reached its node storage capacity. Further, the node handling and storage system may be pre-programmed to fill particular storage rows in a particular order. Once a particular storage container is full, nodes pass through that storage container on the cross-container transport system into another storage container. If upper deck storage containers are used, the nodes may also be transferred from the lower deck to the upper deck via elevator 340. If weights and/or transponders are coupled to the deployment line, such devices may be transferred directly from the node deployment system to containers 319 or may pass through the cleaning container 312 before being routed on the transport system to containers 319. Deployment of the nodes from the node storage and handling system 300 is generally done in a reverse manner as described above, such that the nodes are retrieved from the storage containers, passed through the service and downloading/charging containers, and then to the deployment system.

While not shown in the figures, the disclosed node handling and storage system has one or more computer systems configured to automate one or more processes of the node handling system. In one embodiment, each container has a control system and/or programmable logic controller (PLC) configured to regulate and/or control the conveyor systems and processes within the container. In one embodiment each container may have a predefined set of operations and functions and can operate independently of the other containers. Different containers may have different sets of modes. For example, the storage container may have the following modes that can be selected/performed: service, stop, deploy, convey forward, retrieve, and convey backwards. Such functions can be run locally or requested by higher-level control. Likewise, each device may have a set of modes and/or commands. For example, the single rotatable conveyor may have the following commands: transport, receive, send, and rotate. A motor coupled to the conveyor will receive input parameters controlled from the container functions, processes, and sequences. A series of logic controls (e.g., is the node in the right position, is the next conveyor or container ready to accept the node, is the storage shelf full, is the container full, etc.) may be executed for each control system related to each device.

In some embodiments, all transport systems may be controlled by a master control system in one container. The control system of one container may be coupled to the control system of another container, such that the speed of one container (such as the servicing container) controls the rate of deployment or storage with another container (such as the storage container).

In still other embodiments, each container has a plurality of control sub-systems each coupled to an electronic device (e.g., conveyor, motor, elevator, cleaning unit, motion controller, etc.). Each device may have a motor, position encoder, and computer system coupled to that device. Each node may have a node identification (such as located on a RFID tag), and the node handling system may have a plurality of RFID readers located at various points within the containers and/or transport system for identification of the nodes within the node handling system. The system may report RFID data on each node received and sent. RFID data may be exchanged between each control system and/or PLC. In one embodiment, at all times the location and status of each node can is known and/or can be determined by a master control system. The node handling system may also include a plurality of motion controllers for sensing the speed of node movement from one location to another location and/or to confirm that a node has moved from one position to another position. One goal of the control system may be to make the node handling and storage system as automated and user independent as possible, as well as to regulate and/or control the entire node handling and storage process and system from a single location. The location may be on the marine vessel with the node and handling system, on a separate vessel, or at a more remote location such as from the shore or a remote office.

Transport/Conveyor System

As mentioned above, the disclosed embodiment may comprise one or more conveyors systems in one or more containers of the node handling system. The conveyor system is configured to move nodes to and from the node handling system and the node deployment system, to and from the different containers, and to and from different locations in a particular container. Thus, a conveyor system may include numerous types of conveyor sub-systems, such as conveyor systems that rotate an individual node in a plurality of directions, conveyor systems that move the node to a different height and/or elevation, and conveyor systems that transport the node horizontally or laterally in a specific direction. The conveyor system may be autonomous, semi-autonomous, or manual. The conveyor system is sized and configured for the particular size of node utilized. Differently sized nodes may require slight modifications to the conveyor systems described herein, all within knowledge of one of skill in the art.

FIG. 3 illustrates an embodiment in which each storage container (as well as other containers, such as the downloading/charging container) comprises a transportation device (such as a conveyor belt), which acts as a route for the nodes to pass from container to container, vertical hoisting within the container for a single node or group of nodes, and redirection and rotation within the container for a single node or group of nodes. In a preferred embodiment, the transportation system moves nodes from container to container (cross container conveying) and also move nodes within each container from the entry point to that container to the desired location of the node within that container (whether for storage, downloading, charging, or servicing). The cross container conveyor system can be comprised of a different conveyor system in each container that is coupled to the adjacent container's conveyor system, or can be part of a unitary conveyor system that is integrally connected with all of the containers.

Inside each container one or more conveyors are placed adjacent to each of the side openings in the container. In addition, a small intermediate conveyor is placed in each opening between adjacent containers. The types of conveyors utilized in each container depend on the operations performed in the specific container. Conveyor systems and devices may be mounted at a fixed height or onto an elevator unit. FIGS. 5A-H illustrate various components of a conveyor system utilized in the disclosed node storage and handling system. More or less conveyor systems and devices can be utilized based on the configuration of the node handling and storage system as a whole and the configurations within each container.

Figure 5A:
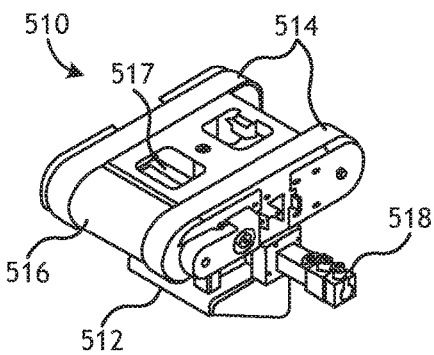
FIGS. 5A-5H illustrate various components of a node conveyor and/or transport system of the disclosed embodiment.
Figure 5B:
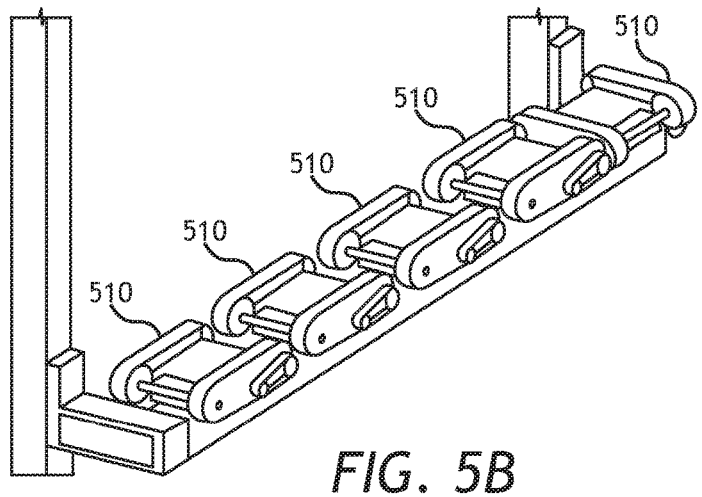

FIG. 5A shows one embodiment of a single rotatable node conveyor 510. Rotatable conveyor 510 is configured to hold one node, and is mounted onto rotation unit base 512 that rotates 90° or 180° back and forth driven by rotation motor 518. The conveyor has a set of two rubber tracks or high friction conveyor belts 514 that are sized to engage opposite ends of a node. Belts 514 are coupled to one or more wheels or drive shaft 516 that are configured to rotate the belts for movement of the nodes in multiple directions (e.g., back and forth) driven by an electric motor 517. Both the conveyor belts and the rotation unit are electrically driven by their respective servo motor and positioned by their respective servo motor encoder. The encoder is used to provide position, rotation, and/or velocity information to the control system as required to correctly position and control the motion of the conveyor belt and orientation of the rotatable conveyor 510. In one embodiment, one of the plurality of wheels is coupled to a driveshaft that is coupled to an electric motor. In addition, the conveyor 510 may have photocells for timing the position of a node when travelling onto the conveyor. Rotation unit base 512 may be coupled for attachment to a fixed object or frame within a container. Rotatable conveyors can be mounted at a fixed or variable height. FIG. 5B shows one embodiment of a plurality of single rotatable conveyors 510 positioned next to each other, which may form one or more of the cross container conveying systems utilized in the disclosed embodiment. As shown, nodes can be transferred from one conveyor to an adjacent conveyor to transport the nodes within a conveyor and/or to an adjacent position. In one embodiment, a storage container 318 comprises five electrically driven conveyors 510 (corresponding to the number of storage racks that are contained in the container) that can be operated individually, with each conveyor 510 being capable of at least a 90 degree rotation to change direction of the nodes from being moved from container to container to conveying the nodes through an individual container.

Figure 5C:
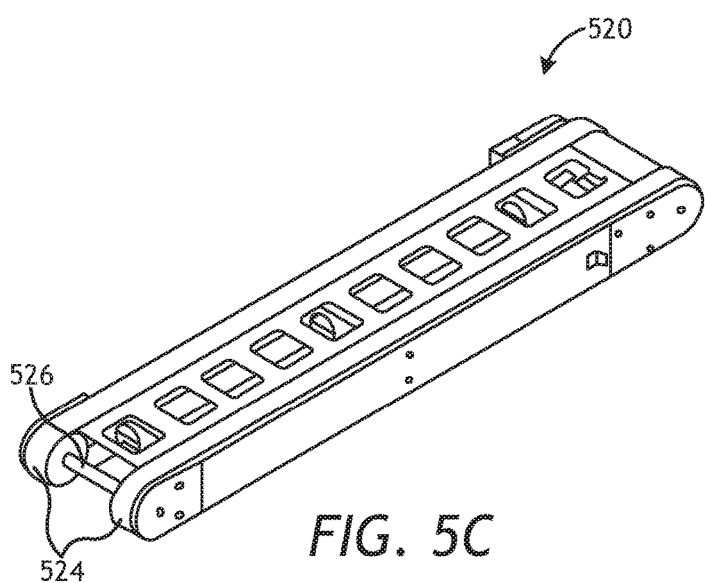

FIG. 5C shows one embodiment of a lateral conveyor system 520. This system is similar to a rotatable conveyor 510 (e.g., it has conveyor belts 524 and wheels 526) but does not rotate as a unit in different directions. In one embodiment, this conveyor can hold three or more nodes at a time. It may be positioned adjacent one or more lateral conveyors or rotatable conveyors. In one embodiment, a container may have a lateral conveyor 520 positioned between a plurality of rotatable conveyors 510. A lateral conveyor may be used to transfer nodes between containers, or it may be coupled to an elevator lift or a node storage rack to move nodes within a container for charging, downloading, and/or storage.

Figure 5D:
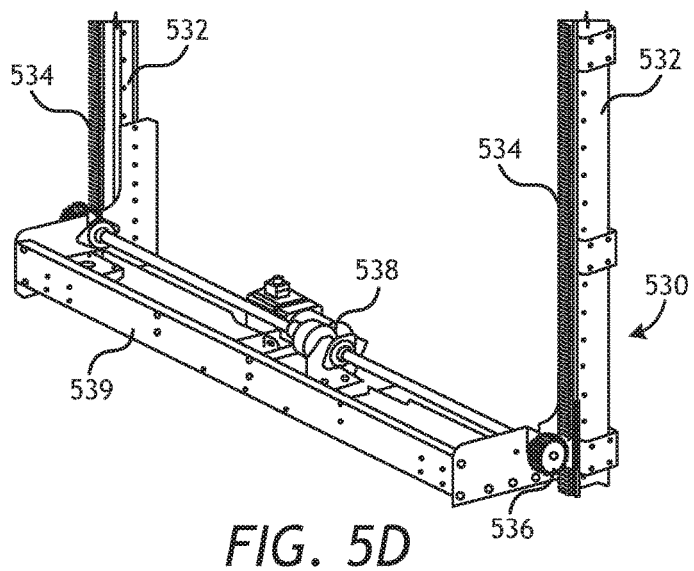
Figure 5E:
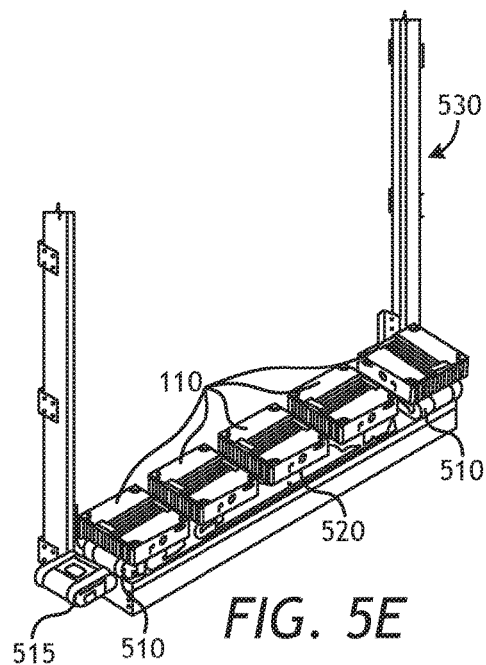

FIGS. 5D and 5E illustrate one embodiment of a lift system 530 utilized in the conveyor system. For some of the containers, such as downloading/charging container 314 and storage container 318, the nodes must be lifted to different rack levels for storage and/or downloading/charging of the nodes. Thus, some of the containers need to have an elevator/lift system to move the nodes to the appropriate vertical height of a node rack/shelf. The cross-container conveyor system in these containers may be coupled and/or mounted to an elevator 530. Elevator 530 may be comprised of a rack and pinion system coupled to a braked servo motor. In one embodiment, elevator system 530 comprises a plurality of vertical posts 532 each coupled to a grooved rack 534. A plurality of pinions 536 are coupled to a shaft that is coupled to a motor 538 that is mounted on a lateral support frame 539. The motor is configured to move the plurality of pinions 536 up and down the plurality of racks 534 as appropriate, thereby lifting the lateral support frame 539 up and down in unison. The elevator mechanism 530 may be located on one end of the container, and the vertical posts 532 may be fastened to the container at or near the corners of the container. In one embodiment, the same elevator 530 may be used in both the downloading/charging container and the storage container, only equipped with different conveyors and configured to move to different working heights. The elevator system 530 may have a frame onto which a plurality of conveyor systems can be mounted. FIG. 5E shows one embodiment of elevator mechanism 530 coupled to a plurality of conveyor systems on which a plurality of nodes 110 are positioned. In one embodiment, a plurality of rotatable conveyors 510 are positioned on each side of a lateral conveyor 520. One of the rotatable conveyors is shown in a rotated (90 degrees) position. The elevator mechanism is configured to move the plurality of conveyors to the appropriate height for positioning of the nodes onto one or more node racks for storage and/or downloading/charging. Also shown is an intermediate conveyor 515 that may or may not be fastened to the elevator mechanism. In one embodiment, intermediate conveyor 515 is positioned in the opening or hole section between adjacent containers. Intermediate conveyor may be coupled to its own motor and/or drive system. In one embodiment, intermediate conveyor is not configured to rotate and only moves the nodes from container to container through each container side opening.

Figure 5F:
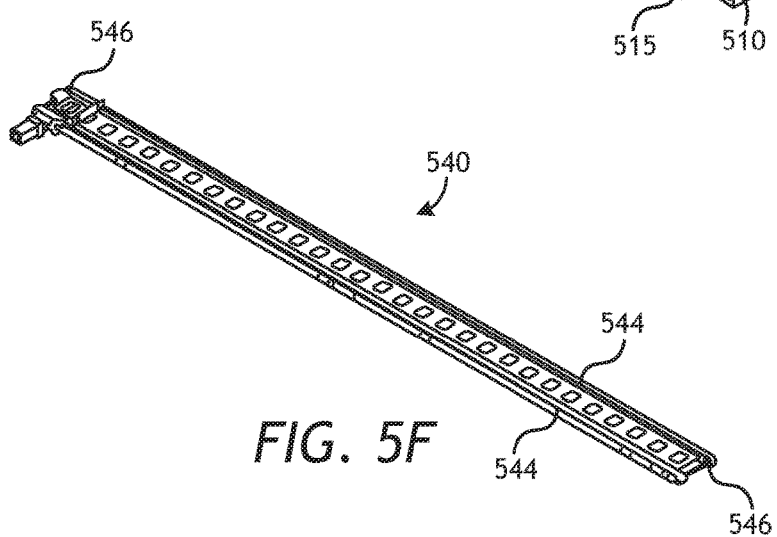
Figure 5G:
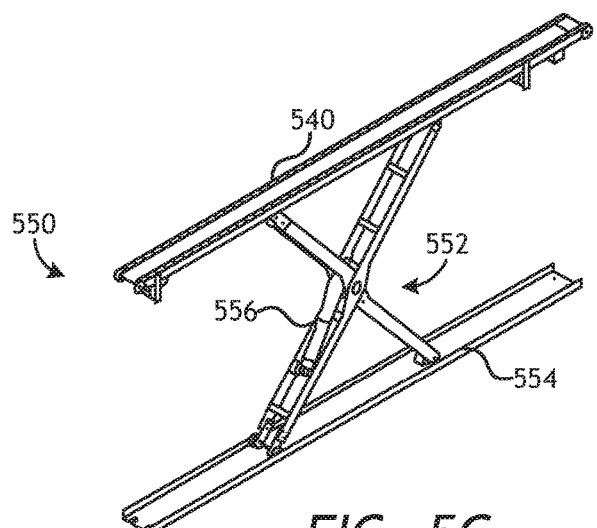

FIG. 5F illustrates one embodiment of an elongated lateral conveyor system 540. The elongated lateral conveyor system 540 may be substantially similar to lateral conveyor system 520 in that they both have a plurality of belts 544 and a plurality of wheels 546 that are coupled to at least one motor or drive system. The elongated lateral conveyor system 540 may be narrower than the lateral conveyor system 520 so that it can fit between the node racks/shelves of a particular container. Because the elongated conveyor system 540 is long—and may be as long as the side of a container and/or the length of a storage rack—one or more intermediate pulleys, rollers, and/or motors may be needed (not shown) that facilitates movement of the plurality of belts. Elongated system 540 may be a stationary conveyor system that is mounted at a fixed height within a node rack system. In other embodiments, it may be coupled to a lift system, such as that shown in FIG. 5G, to move between different node racks. Lift system 550 is shown in FIG. 5G and may be utilized to move a plurality of nodes onto a node rack and at different positions within the node rack. In one embodiment, lift system 550 may comprise a base 554 that is mounted to the bottom of the container, a scissors lift 552 that slides along the base and is actuated to an extended or retracted position by hydraulic cylinder 556, an electromechanical screw jack, or other lifting device. Lift 552 may be coupled to lateral conveyor 540. Lift system 550 may be configured to move to a plurality of node racks at a plurality of vertical heights and to position the plurality of nodes on the node racks. In one embodiment, lift system 550 and elongated conveyor system 540 are positioned substantially perpendicular to the cross conveyor system and/or plurality of conveyors as is shown in FIGS. 5B and 5E.

Figure 5H:
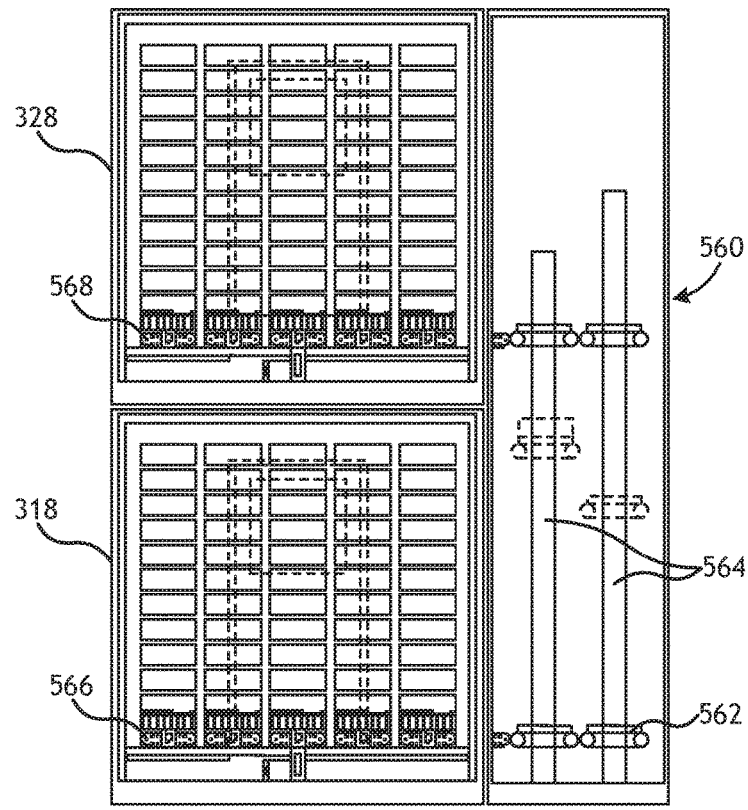

As shown in FIG. 3, storage containers may be stacked on top of each other to form a first plurality of storage containers on lower deck 318 and a second plurality of storage containers on upper deck 328, with an elevator mechanism 340 that transfers the nodes from the lower deck to the upper deck. FIG. 5H shows one embodiment of elevator mechanism 560 (which may be substantially similar to elevator mechanism 340) from a side view perspective. The elevator itself may be comprised of multiple conveyer belts or lifting mechanisms 564 to transfer the nodes between the lower and upper storage containers 318 and 328, respectively. Lifting mechanism 564 may be similar to elevator mechanism 530 or lift mechanism 550. Each lifting mechanism 564 may be coupled to a rotatable conveyor device 562, which may be substantially similar to rotatable conveyor 510. A cross conveyor system 566 may transport a plurality of nodes through a side container opening (not shown) to lifting mechanism 564, which may move the node to a second hole contained in the second deck storage container 328. A cross conveyor system 568 in storage container 328 may be configured to receive the nodes from the elevator mechanism and position them into the appropriate storage rack, similar to how nodes are stored in storage container 318. In one embodiment, the compartment of elevator mechanism 340 has a vertical height equal to the combined container heights of the lower and upper containers. For other embodiments, the elevator compartment may be less than the combined heights of the lower and upper containers and only tall enough to move the nodes to the second layer of storage containers.

Containers

Referring now to FIGS. 6-9, these figures show exemplary arrangements of specific components of the containers shown in FIG. 3. Variations of these containers (and the stations and components and arrangements described therein) falls within the scope of this disclosure. In one embodiment, the length of each container is a standard size of approximately 20 feet.

Figure 6A:
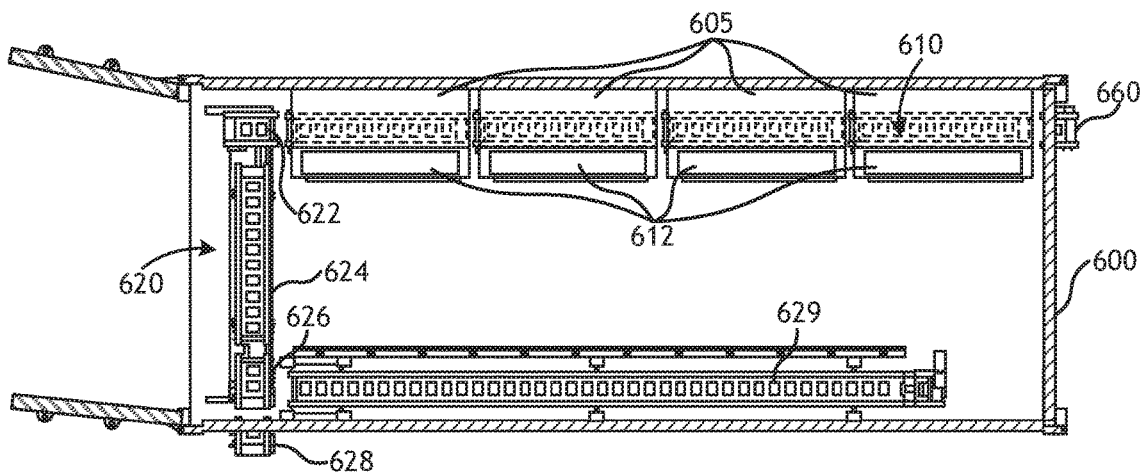
FIGS. 6A and 6B illustrate one embodiment of a cleaning container from a top and side perspective, respectively.
Figure 6B:
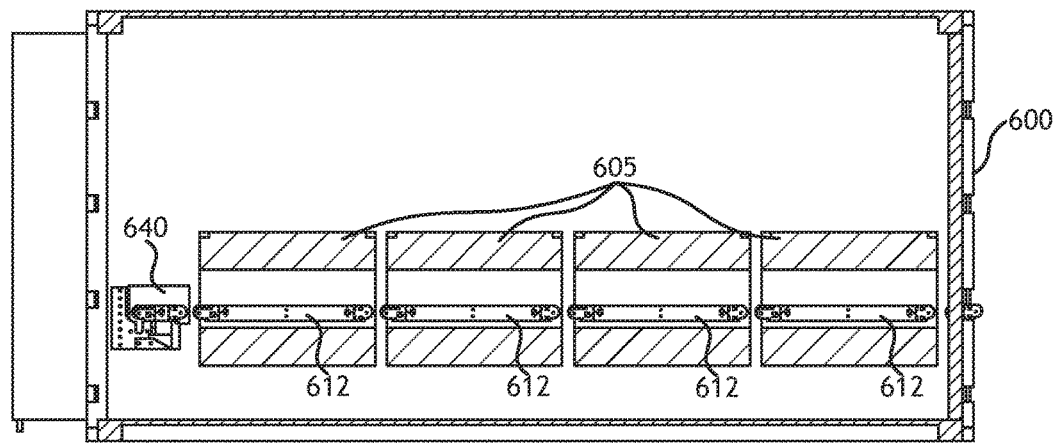

FIGS. 6A and 6B show one embodiment of cleaning container 600 (which may be substantially similar to cleaning container 312), which includes one or more washing and drying units 605 to remove dirt, debris, and seawater from the nodes. FIG. 6A shows container 600 from a top perspective and FIG. 6B shows container 600 from a side perspective. Washing/drying units 605 may be integrated units or the container may comprise a plurality of separate washing units and drying units. The nodes are preferably cleaned and dried after being retrieved from the ocean. The cleaning can be performed by an automated process or by personnel on the vessel. The washing stations 605 may include high pressure nozzles oriented to wash different sections of the nodes. The washing stations 605 may also include rotatable conveyors inside each washing container that are configured to properly align and/or rotate the node for cleaning and/or handling in the node storage and handling system. In one embodiment, each of the plurality of cleaning units 605 comprises a different process to clean, wash, and/or dry the nodes. Cleaning container 600 comprises an entry/exit point to the node handling system that may be coupled to an entry/exit conveyor system 660 that moves the nodes to and from the node deployment system and the node handling system. Cleaning container 600 comprises a portion of conveyor system 350. A first conveyor system 610 may comprise one or more lateral or rotatable conveyor systems 612 that transfers one or more nodes from the entry/exit point conveyor 660 through the plurality of washing/drying units 605. In one embodiment, each washing/drying unit is coupled to an internal lateral conveyor system 612 that moves the nodes through the unit and to the next unit or station. In one embodiment, first conveyor system 610 is substantially positioned on one side of the container and is coupled to a second conveyor system 620 that is substantially positioned on one end of the container, such that conveyor system 610 is substantially perpendicular to conveyor system 620. Because conveyor system 620 assists in the movement of nodes from container to container, it may also be considered as a cross-container conveyor system or part of a cross-container conveyor system. Conveyor system 620 may include a first rotatable node conveyor 622, a lateral node conveyor 624, a second rotatable node conveyor 626, and an intermediate conveyor 628. Other conveyor devices, components, and systems are possible and may be coupled together in a variety of configurations to move nodes from one container or section to another container or section. In other embodiments, a plurality of conveyor systems may be located at different heights in the container to transport more nodes and/or to act as a backup in case the primary conveyor system fails. In one embodiment, first rotatable node conveyor 622 is configured to receive a node from conveyor system 610 and conveyor 624. Rotatable node conveyor 622 is configured to rotate to re-position the node as necessary. Rotatable node conveyor 622 rotates approximately 90 degrees to receive and send nodes to adjacent positions on the conveyor system. Conveyor 624 moves one or more nodes in a single direction from node conveyor 622 to node conveyor 626, and vice versa. In one embodiment, it is approximately three times in length (e.g., sized to convey three nodes at a time) as the rotatable single node conveyor. Likewise, second rotatable node conveyor 626 is configured to receive and send nodes to adjacent positions between conveyor 624 and intermediate conveyor 628 or a storage conveyor 629 to be used to temporarily hold nodes during recovery or deployment. Hole or opening 640 in the container side wall is sized and positioned for the nodes and any conveyor system to pass the nodes from one container to the adjacent container. In one embodiment, opening 640 is located at approximately the same height as the conveyor system 620. Intermediate conveyor 628 is substantially positioned in opening 640 and is configured to move nodes from one container to the other container and in one embodiment from one conveyor system in one container to another conveyor system in another container. Cleaning container 600 may have open space for operators and other personnel to view and/or assist in the cleaning of the nodes as necessary.

Figure 7A:
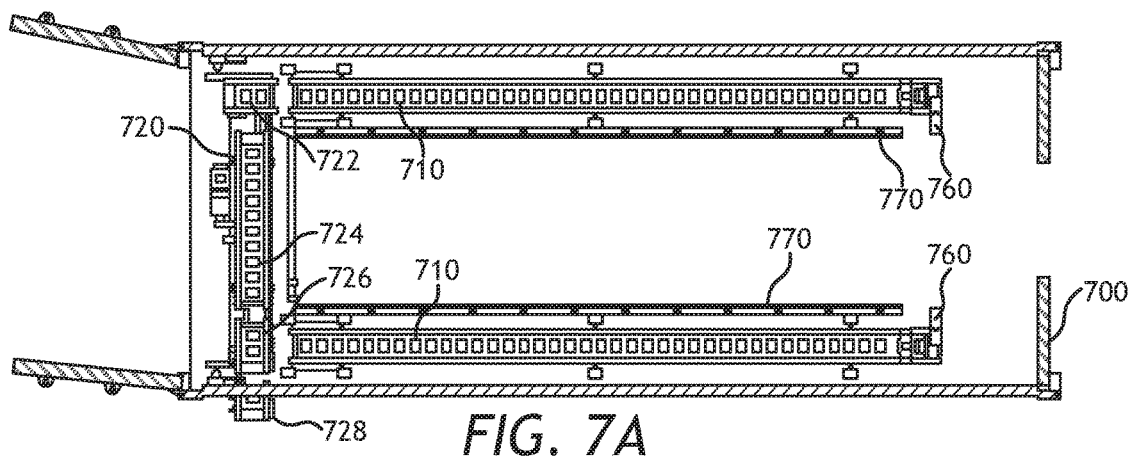
FIGS. 7A-7C illustrate one embodiment of a downloading/charging container from a top, side, and front perspective, respectively.
Figure 7B:
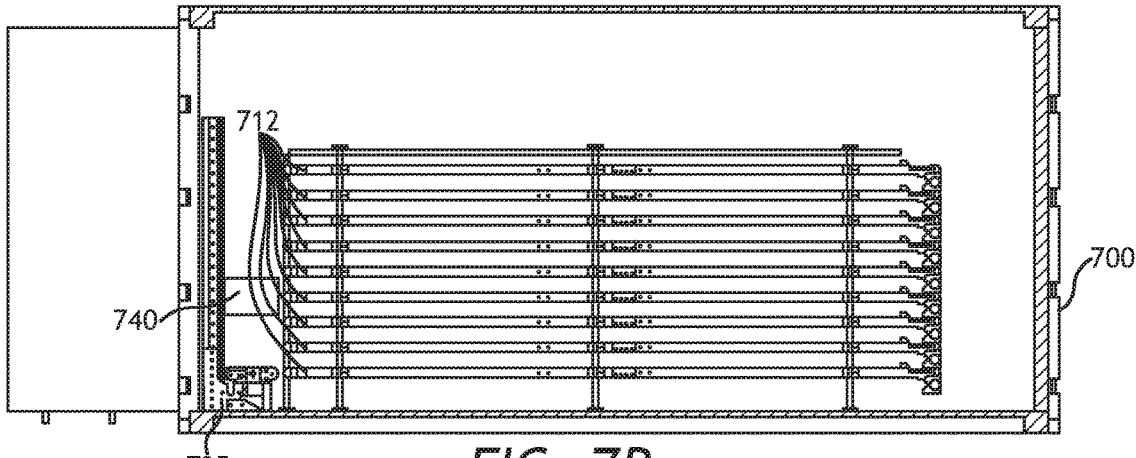
Figure 7C:
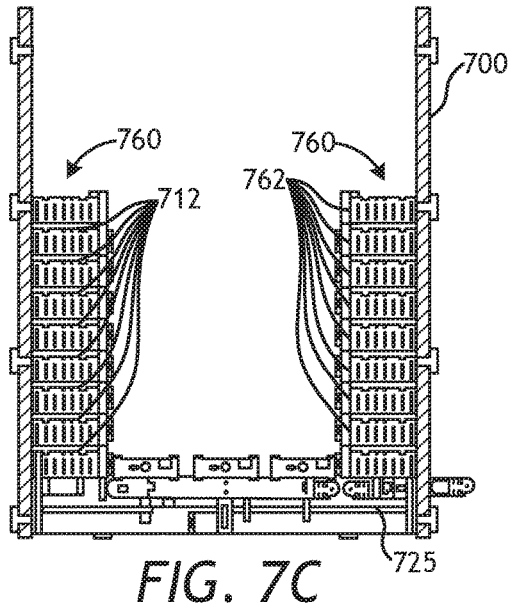

FIGS. 7A, 7B, and 7C show one embodiment of charging/downloading container 700 (which may be substantially similar to charging/downloading container 314). FIGS. 7A-7C illustrate a top, side, and front schematic of the container, respectively. Further, FIG. 7C shows a plurality of nodes 110 positioned on the conveyor system and node racks from an end/front view of the container. Charging/downloading container 700 is configured to recharge and/or power the power supplies (e.g., batteries) of the nodes and to transfer data to and from the nodes (e.g., seismic data acquired during the seismic survey). In one embodiment, charging/downloading container 700 comprises one or more conveyor systems 720, one or more node racks 760, and one or more charging/downloading systems 770 with an interlocked safety barrier.

Container 700 may have at least two separate charging/downloading racks 760 that store a plurality of nodes for charging and/or downloading. The size and configuration of the racks depends on the configuration of the container and dimensions of the node. In one embodiment (with a node size of approximately 350 mm by 350 mm by 150 mm), each rack 760 may comprise eleven rows (or levels) 762 at different vertical heights that each holds approximately eleven nodes per row. Thus, approximately 242 nodes (121 nodes per rack) can be charged and/or downloaded in the charging/downloading container at any given time. Of course, more or less racks and rows can be utilized to achieve a higher or lower node capacity. In another embodiment, only three rows (or levels) are used per rack, each of which stores ten nodes per row, providing a capacity of approximately 60 nodes. In one embodiment, the racks are more than half of the length of the container 700, and in other embodiments, the racks are substantially the length of the container 700. Each rack and/or row may be coupled to a conveyor and charging/downloading system, as described in more detail below. The racks may be configured with side and top guards on each row to prevent the nodes from falling off of the racks during vessel movement. Safety locks may be utilized for the entry and exit points on each row to prevent nodes from falling off.

In one embodiment, conveyor system 720 is configured to receive and send nodes to adjacent containers and to transport nodes to and from the node racks for charging and/or downloading. Thus, in one embodiment a first conveyor system 720 is substantially positioned on one end of the container that is coupled to one or more second conveyor systems 710 that are substantially positioned on one or more sides of the container, such that conveyor system 710 is substantially perpendicular to conveyor system 720. Because conveyor system 720 assists in the movement of nodes from container to container, it may also be considered as a cross-container conveyor system or part of a cross-container conveyor system. Conveyor system 720 may include a first rotatable node conveyor 722, a lateral node conveyor 724, a second rotatable node conveyor 726, and an intermediate conveyor 728. Other conveyor devices, components, and systems are possible and maybe coupled together in a variety of configurations to move nodes from one container or section to another container or section. For example, if additional racks are utilized for charging/downloading and are positioned in the middle of the container, five rotatable node conveyors may be utilized instead of merely two. In one embodiment, first rotatable node conveyor 722 is configured to receive and send nodes to and from intermediate conveyor 628. Rotatable node conveyor 722 rotates approximately 90 degrees to receive and send nodes to a first portion of conveyor system 710. Conveyor 724 moves one or more nodes in a single direction from node conveyor 722 to node conveyor 726, and vice versa. In one embodiment, it is approximately three times in length (e.g., sized to convey three nodes at a time) as the rotatable single node conveyor. Likewise, rotatable node conveyor 726 rotates approximately 90 degrees to receive and send nodes to a second portion of conveyor system 710. Second rotatable node conveyor 726 is also configured to receive and send nodes between conveyor 724 and conveyor 728. Hole or opening 740 in the container side wall is sized and positioned for the nodes and any conveyor systems to pass the nodes from one container to the adjacent container. Intermediate conveyor 728 is substantially positioned in opening 740 and is configured to move nodes from one container to the other container and in one embodiment from one conveyor system in one container to another conveyor system in another container.

As mentioned above, conveyor system 720 is configured to transport nodes to and from the node racks for charging and/or downloading and conveyor system 710 is substantially positioned on one or more sides of the container and may be coupled to node racks 760. A wide variety of transport systems can be utilized to transport the nodes to the racks (and each level of the racks) and to various positions along the rack. In one embodiment, as shown in FIG. 7B, each level of the rack has a lateral conveyor 712 that runs substantially the length of the rack. Thus, if the container has 22 rows (11 rows per rack), approximately 22 conveyors 712 are needed. Conveyor 712 is configured to move nodes from a first end of conveyor 712 to a second end of conveyor 712. The conveyor 712 is configured to move nodes to and from conveyor system 720.

Because the plurality of conveyors 712 are arranged at various heights, transport system 720 is configured to move a plurality of nodes to the plurality of conveyors 712 at different heights. In one embodiment, transport system 720 is coupled to an elevator mechanism 725 (discussed in more detail in relation to FIGS. 5D and 5E) that is configured to lift the transport mechanism 720 (and any nodes that are located on the conveyor 720) to the appropriate heights. A single node or a plurality of nodes may be lifted to the desired height. In one embodiment, conveyor system 720 is configured to hold five nodes (e.g., two nodes on the two rotatable conveyors 722 and 726 and three nodes on lateral conveyor 724). Once the desired number of nodes are positioned on conveyor 720, elevator mechanism 725 moves to the appropriate height of the desired rack row. Either rotatable conveyor 722 or 726 rotates the node to the correct orientation or position and then moves the node to the rack row 762 (or a conveyor 712 on the rack row 762). In one embodiment, the power and/or electrical connections of the node are oriented towards the inside of the container, such that operators can attach cable connectors to each of the nodes. Lateral conveyor 724 moves additional nodes (one at a time) to rotatable conveyor 722 or 726, which again moves the node to the rack. In one embodiment, transport system 710 is electronically synchronized and/or coupled to transport system 720 such that as nodes are transferred between the systems, conveyors on each system move appropriately to receive and/or send the nodes. For example, as a node is transported from rotatable node 722 to conveyor 712, conveyor 712 may be configured to advance one position (approximately the length of one node) such that additional space on the conveyor is made available to receive an additional node. Once all of the node positions on a given rack level are taken, elevator mechanism 725 is programmed to move to another rack level for the transport of additional nodes.

In one embodiment, charging/downloading system 770 is configured to couple to each of the plurality of nodes that are located on the node racks 760. Such downloading and/or charging can be done on an individual node basis or simultaneously for a plurality of nodes, and can be done by autonomous, semi-autonomous, or manual methods. Wires or cables can be attached or coupled (via automated or manual processes) to each node for individual node recharging and/or data transfer. For example, charging/downloading container 700 may have an open space for operators and other personnel to assist in the charging and/or downloading of the nodes, such as by connecting cables to the nodes for power and/or data transfer. In other embodiments, one or more electrical contacts on the node racks can be used for charging an entire row of nodes. For example, the node racks may have rail mechanisms from which a corresponding groove on the node can fit, and the rail and corresponding node grooves may have electrical contacts for charging or powering the node, as well as data transfer. In an alternative embodiment, each of the nodes may be charged or powered via wireless means (such as electromagnetic or optical links), which can take place on the node racks 760 or in some other portion of the container. Data can be transferred from or to the node from a plurality of network connections. In one embodiment, each node has a separate network connection to the charging/downloading system 770. Thus, if the node racks are configured to hold 242 nodes, approximately 242 network connections may be coupled to the node racks.

Figure 8A:
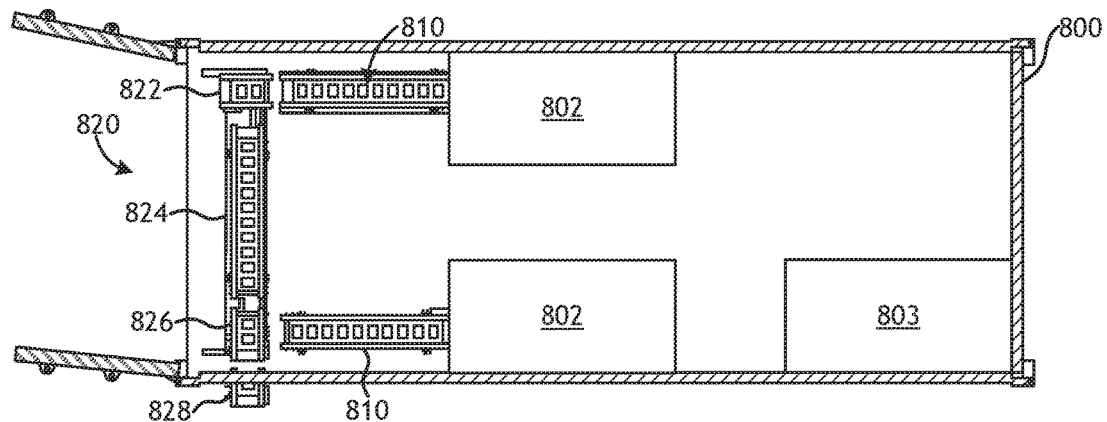
FIGS. 8A and 8B illustrate one embodiment of a service container from a top and side perspective, respectively.
Figure 8B:
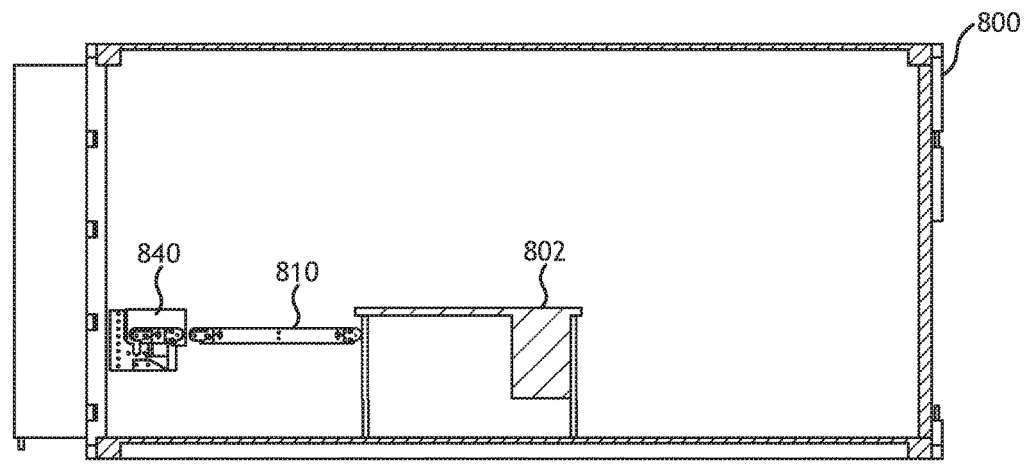

FIGS. 8A and 8B show one embodiment of service container 800 (which may be substantially similar to service container 316). FIGS. 8A-8B illustrate a top and side schematic of the container, respectively. Service container 800 is configured to facilitate inspection, maintenance, and servicing of the nodes. If a node requires a battery change (and not just a recharge of the batteries), that operation may need to be performed in the service container. Likewise, if a node has a problem and/or requires technical servicing, it may be repaired and subject to testing in the service container. Service container 800 may include one or more transport systems 820, one or more workbenches 802, and various storage compartments 803. Transport systems contained in this container may be similar to the other transport systems in other containers. In one embodiment, the transport system 820 is configured to receive and send nodes to adjacent containers and to transport nodes within the service container to a workbench. A first conveyor system 820 may be substantially positioned on one end of the container and coupled to one or more second conveyor systems 810 that are substantially positioned on one or more sides of the container, such that conveyor system 810 is substantially perpendicular to conveyor system 820. Conveyor system 820 may include a first rotatable node conveyor 822, a lateral node conveyor 824, a second rotatable node conveyor 826, and an intermediate conveyor 828. Other conveyor devices, components, and systems are possible and maybe coupled together in a variety of configurations to move nodes from one container or section to another container or section. In one embodiment, first rotatable node conveyor 822 is configured to receive and send nodes to and from intermediate conveyor 728. Rotatable node conveyor 822 is configured to rotate approximately 90 degrees to receive and send nodes to a first portion of conveyor system 810. Conveyor 824 moves one or more nodes in a single direction from node conveyor 822 to node conveyor 826, and vice versa. In one embodiment, it is approximately three times in length (e.g., sized to convey three nodes at a time) as the rotatable single node conveyor. Likewise, rotatable node conveyor 826 rotates approximately 90 degrees to receive and send nodes to a second portion of conveyor system 810. Second rotatable node conveyor 826 is also configured to receive and send nodes between conveyor 824 and conveyor 828. Hole or opening 840 in the container side wall is sized and positioned for the nodes and any conveyor systems to pass the nodes from one container to the adjacent container. Intermediate conveyor 828 is substantially positioned in opening 840 and is configured to move nodes from one container to the other container and in one embodiment from one conveyor system in one container to another conveyor system in another container. Conveyor system 810 may comprise one or more lateral conveyors, which may be utilized to transfer nodes from conveyor system 820 to one or more workstations or workbenches 802.

Figure 9A:
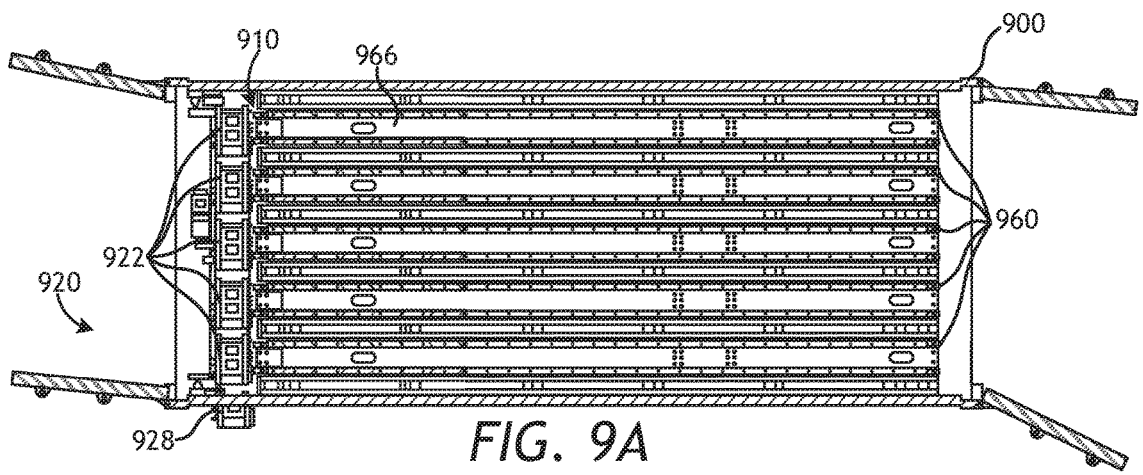
FIGS. 9A-9C illustrate one embodiment of a storage container from a top, side, and front perspective, respectively.
Figure 9B:
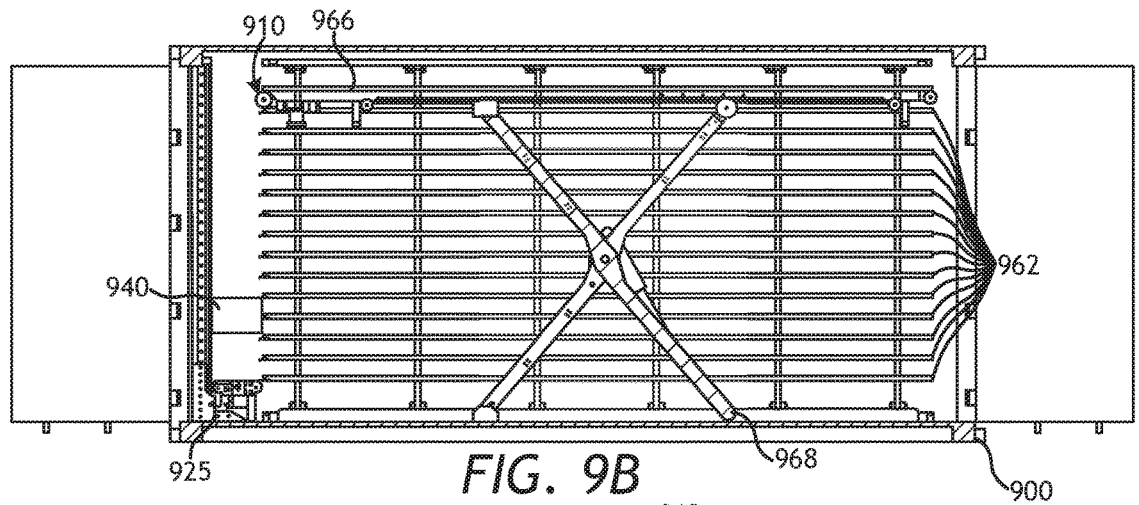
Figure 9C:
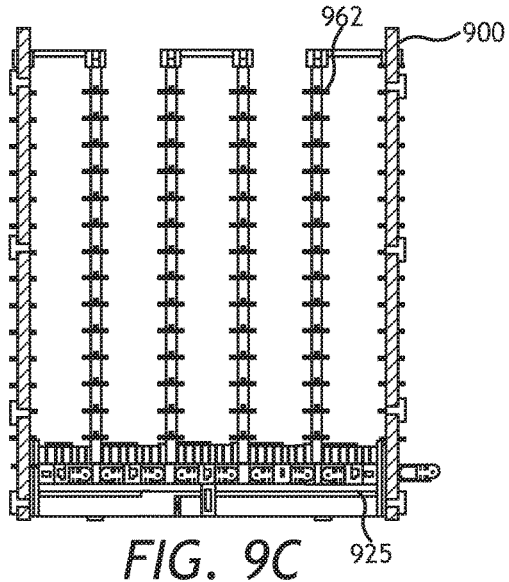

FIGS. 9A-9C show one embodiment of storage container 900 (which may be substantially similar to storage container 318). FIGS. 9A-9C illustrate a top, side, and front schematic of the container, respectively. Further, FIG. 9C shows a plurality of nodes positioned on the conveyor system from an end/front view of the container. Storage container 900 is configured to hold a high capacity of nodes before and after being deployed in the sea. In one embodiment, each storage container is a standard 20 foot container and holds between approximately 500 to 1000 nodes. Storage container 900 may comprise one or more conveyor systems and one or more storage racks 960. The size and configuration of the racks depends on the configuration of the container and dimensions of the node. Each rack 960 may comprise a series of rows (or levels) at different heights for storage of a plurality of nodes. In one embodiment, storage container 900 comprises five racks 960, each of which has fifteen rows (or levels) 962 with each configured to store thirteen nodes per row for a total storage of approximately 975 nodes per container. If only twelve rows are used, each container may hold approximately 780 nodes. Various configurations and more or less racks and rows can be utilized to achieve a higher or lower node capacity. For example, the container may be configured with a number of racks configured with rows that hold twelve nodes or less with the remaining racks having rows configured to hold thirteen nodes. In one embodiment, the racks are more than half of the length of the container 900, and in other embodiments, the racks are substantially the length of the container 900. In one embodiment, there is no room for movement in the storage container by operators when it is fully loaded with nodes.

In one embodiment, conveyor system 920 is configured to receive and send nodes to adjacent containers and to transport nodes to and from the node racks for storage. Thus, in one embodiment conveyor system comprises a first conveyor system 920 that is substantially positioned on one end of the container that is coupled to one or more second conveyor systems 910 that are substantially positioned parallel to the sides of the container, such that conveyor system 910 is substantially perpendicular to conveyor system 920. Conveyor system 920 may include a plurality of rotatable node conveyors 922 and intermediate conveyor 928. Other conveyor devices, components, and systems are possible and maybe coupled together in a variety of configurations to move nodes from one container or section to another container or section. For example, if five node storage racks 960 are utilized, then five rotatable node conveyors 922 may be necessary. In one embodiment, a first rotatable node conveyor 922 is configured to receive and send nodes to and from intermediate conveyor 828. Rotatable node conveyor 922 is configured to rotate to receive and send nodes from adjacent portions of the conveyor system and to one of the node storage racks 960. Hole or opening 940 in the container side wall is sized and positioned for the nodes and any conveyor systems to pass the nodes from one container to the adjacent container. Intermediate conveyor 928 is substantially positioned in opening 940 and is configured to move nodes from one container to the other container and in one embodiment from one conveyor system in one container to another conveyor system in another container.

In one embodiment, each rack may have has its own conveyor system, similar to the downloading/charging racks 760. Similar to the transport system for the downloading/charging container 700, conveyor system 920 is configured to move a node from a position on conveyor system 920 by rotating node conveyor 922 by 90 degrees to position a node onto a conveyor 966 on each rack row. Rather than each row having its own conveyor system, the storage racks may comprise a plurality of levels, each with one or more storage mechanisms to hold and/or store a plurality of nodes. For example, each level or row of a storage rack may comprise a plurality of bars, rods, or rails 962 upon which one or more nodes can be positioned. In one embodiment, conveyor system 910 comprises a lateral conveyor 966 that may be attached or coupled to a lifting or hoisting mechanism 968 (such as a scissors lift) that is configured to raise conveyor 966 to a certain height, such as the height of each row. In one embodiment, lateral conveyor 966 is substantially the length of storage racks 960. During transfer of the nodes to and from storage racks 960, lateral conveyor 966 may be positioned slightly above rails 962 so that the nodes do not touch the rails, racks, and/or shelves. Once the desired number of nodes have been transferred from conveyor system 920 to conveyor 966, lifting mechanism 968 lowers lateral conveyor 966 a predetermined distance, which allows engagement and/or contact of a plurality of nodes to rails 962. In other words, lowering of lifting mechanism 968 (and the coupled conveyor 966) allows the plurality of nodes to dropped or be set on top of rails 962. The lateral conveyor 966 can be lowered to a lower level/row of the rack for storing another plurality of nodes. In one embodiment, the rows on the uppermost level of the racks are filled first, and each lower level is subsequently filled to capacity with the desired number of nodes. In deployment mode, nodes from the lowermost level of the racks are deployed first. Thus, the system may be a first in last out (FILO) storage system. As each level is deployed, the elevator mechanism 968 raises the conveyor 966 to touch and/or engage the bottom portions of the nodes and then lifts or raises the nodes from contact with the rails 962. In one embodiment, the width of conveyor 966 and lifting mechanism 968 is less than the horizontal distance between a first and second rail 962 so as to freely move the entire vertical distance of rack 960. Other transport systems and devices can be utilized to transport the nodes to the racks (and each level of the racks) and to various positions along the rack.

Because the plurality of racks have multiples rows/levels at various heights, transport system 920 is configured to move a plurality of nodes to the plurality of racks 960 at different heights. In one embodiment, transport system 920 (which is substantially similar to transport system 720) is coupled to an elevator mechanism 925 that is configured to lift the transport mechanism 920 (and any nodes that are located on the conveyor 920) to the appropriate heights. Once the desired number of nodes are positioned on conveyor 920, elevator mechanism 925 moves to the appropriate height of the desired rack row. In some embodiments, a plurality of nodes are moved to a rack 960 in serial fashion, and in other embodiments a plurality of nodes are moved to a plurality of racks 960 in parallel fashion. Once all of the node positions on a given rack level are taken, elevator mechanism 925 is programmed and/or instructed to move to another rack level for the positioning of additional nodes. After the nodes on conveyor 920 have been transferred to one or more racks 960, conveyor 920 is lowered to a base or standard level (e.g., approximately the same height as openings 840 and 940) and re-configured to receive additional nodes from the transport system of the adjacent container. Conversely, in deployment mode, once conveyor 920 is full of nodes from a specific rack level, conveyor 920 is lowered down to a predetermined height so that conveyor 920 is coupled to the transport system of an adjacent container.

Many other variations in overall configuration, style of nodes, number and arrangement of containers and compartments are possible within the scope of the invention. As one example, the charging/downloading and workshop containers can be included in one larger area of combined and/or integrated containers. In one embodiment, one container may be a charging container and another container may be a downloading container; in other embodiments the charging and/or downloading functions may be performed at other locations in the node handling and storage system. As another example, the path through the containers the nodes take for deployment can be different than the path the nodes take once they are recovered from the sea and removed from the cable. As another example, different containers may have different types of conveyor systems. In still another embodiment, a plurality of cross-container conveyor systems may be used, whether on different ends of the containers or whether they are at different vertical heights on the same end of the container. In still other embodiments, the nodes may be transported from the node handling system to the node deployment system (and vice versa) via any one or more of the containers, such as from a cleaning container, service container, downloading/charging container, and/or storage container. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An autonomous seismic node handling system, comprising:
   a plurality of autonomous seismic nodes;
   a plurality of portable storage containers, each configured to hold at least a portion of the plurality of autonomous seismic nodes, wherein the plurality of portable storage containers are located on a back deck of a marine vessel, wherein the plurality of portable storage containers are arranged side by side; and
   a transport system located within each of the plurality of portable storage containers that is configured to transport the plurality of seismic nodes between each of the plurality of portable storage containers.

2. The system of claim 1, wherein a length of the transport system is approximately the same as a width of at least one of the plurality of portable storage containers.

3. The system of claim 1, wherein the transport system is configured to transfer the plurality of seismic nodes through a side of at least one of the plurality of portable storage containers.

4. The system of claim 1, wherein the transport system comprises a plurality of conveyor units.

5. The system of claim 1, wherein the transport system is configured for vertical and lateral movement of the plurality of nodes within each of the plurality of portable storage containers.

6. The system of claim 1, wherein each of the plurality of portable storage containers comprises a plurality of columns of storage racks, wherein each column has a plurality of levels that is configured to hold a portion of the plurality of nodes, wherein the transport system is configured to move more an autonomous seismic node to more than one of the plurality of storage racks at substantially the same time.

7. An autonomous seismic node handling system, comprising:
   a plurality of portable storage containers located on a back deck of a marine vessel, each configured to hold a plurality of autonomous seismic nodes, wherein the storage system comprises a plurality of columns of storage racks, wherein each column has a plurality of levels that is configured to hold a portion of the plurality of nodes;
   a transport system located within each of the plurality of portable storage containers that is configured to move the plurality of autonomous seismic nodes within each of the plurality of portable storage containers; and
   a lift system coupled to the transport system and configured to raise and lower the transport system to a height of each of the plurality of levels.

8. The system of claim 7, wherein the lift system is configured to hold more than one of the plurality of autonomous seismic nodes at the same time at substantially the same height.

9. The system of claim 7, wherein the transport system is configured to rotate at least one autonomous seismic node at substantially the same time to each of the plurality of columns of storage racks.

10. The system of claim 7, wherein the transport system is configured to move at least one autonomous seismic node to each of the plurality of columns of storage racks at substantially the same time.

11. The system of claim 7, wherein the lift system comprises a rack and pinion system.

12. The system of claim 7, wherein the lift system has a first end coupled to a first post and a second end coupled to a second post, wherein the lift system is configured to move up and down the first and second posts at the same time.

13. The system of claim 7, wherein the lift system is located substantially at one end at each of the plurality of portable storage containers.

14. An autonomous seismic node handling system, comprising:
   a plurality of autonomous seismic nodes;
   a first plurality of portable containers, each configured to hold at a first portion of the plurality of autonomous seismic nodes, wherein the plurality of portable containers are located on a back deck of a marine vessel;
   a second plurality of portable containers, each configured to hold a second portion of the plurality of autonomous seismic nodes, wherein the plurality of portable containers are located on the back deck of the marine vessel, wherein the second plurality of portable containers is configured to be placed on top of the first plurality of portable containers; and
   a vertical transport system that is configured to vertically transport at least some of the plurality of seismic nodes between the first plurality of portable containers and the second plurality of portable containers.

15. The system of claim 14, wherein at least one of the first plurality of portable containers has a first transport system at a first height and at least one of the second plurality of portable containers has a second transport system at a second height, wherein the vertical transport system is configured to move at least some of the plurality of seismic nodes from the first height to the second height.

16. The system of claim 14, wherein the vertical transport system is located within at least one of the plurality of storage containers.

17. The system of claim 14, wherein the vertical transport system is located exterior to the plurality of storage containers.

18. A method for automatically transporting a plurality of seismic nodes on the deck of a marine vessel, comprising:
   positioning a first plurality of autonomous seismic nodes in a first portable storage container on a back deck of a marine vessel; and
   moving the first plurality of autonomous seismic nodes from the first portable storage container to a second portable storage container, wherein the moving step is through a side wall of the first portable storage container and a side wall of the second portable storage container.

19. The method of claim 18, further comprising raising the first plurality of autonomous seismic nodes within the second portable storage container to a first height at substantially the same time.

20. The method of claim 18, further comprising transferring the first plurality of autonomous seismic nodes onto one or more storage racks located within the second portable storage container.

21. The method of claim 18, further comprising transferring the first plurality of autonomous seismic nodes onto a plurality of storage racks located within the second portable storage container at substantially the same time.

* * * * *